United States Patent [19]

Ichikawa

[11] Patent Number: 4,944,581
[45] Date of Patent: Jul. 31, 1990

[54] REAR FACE REFLECTION MIRROR OF MULTILAYER FILM FOR SYNTHETIC RESIN OPTICAL PARTS

[75] Inventor: Hajime Ichikawa, Sagamihara, Japan

[73] Assignee: Olympus Optical Company Limited, Japan

[21] Appl. No.: 396,640

[22] Filed: Aug. 18, 1989

[30] Foreign Application Priority Data

Sep. 20, 1988 [JP] Japan .............................. 63-235556

[51] Int. Cl.⁵ .......................... G02B 5/08; G02B 5/28; G02B 1/00
[52] U.S. Cl. .................................... 350/641; 350/642; 350/164; 428/912.2; 428/333; 428/702
[58] Field of Search ............... 350/641, 642, 164, 166, 350/1.7; 428/912.2, 333, 702

[56] References Cited

U.S. PATENT DOCUMENTS 4,179,181 12/1979 Chang .................................. 350/166

FOREIGN PATENT DOCUMENTS

| 3005621 | 8/1981 | France | 350/642 |
| 56-162702 | 5/1980 | Japan | 350/642 |
| 60-131501 | 7/1985 | Japan | 350/642 |
| 60-212705 | 10/1985 | Japan | 350/164 |
| 60-15604 | 11/1985 | Japan | 350/642 |

Primary Examiner—Jon W. Henry
Attorney, Agent, or Firm—Bruce L. Adams; Van C. Wilks

[57] ABSTRACT

A rear face mirror comprised of multilayer film for use in a synthetic resin optical part has a five or six layer structure formed on a synthetic resin substrate and made from SiO, (SiO$_2$), CeO$_2$, Al(Al) and SiO(Cu) having particular optical or mechanical thickness.

4 Claims, 3 Drawing Sheets

REAR FACE REFLECTION MIRROR OF MULTILAYER FILM FOR SYNTHETIC RESIN OPTICAL PARTS

BACKGROUND OF THE INVENTION

1. Field of the Invention

This invention relates to a rear face reflection mirror of multilayer film for synthetic resin optical part.

2. Related Art Statement

Recently, the frequency of using synthetic resin optical parts such as lens and the like becomes higher, and particularly there is a prism as a synthetic resin optical part, which is considered to be more demanded for use in camera, audiovisual eqipment or the like in future. The synthetic resin optical parts can attain the formation of complicated shapes and the reduction of cost and weight as compared with the optical parts made from glass. Particularly, they are easy in the working for the formation of prisms having different shapes or the like as compared with the glass optical parts.

In the formation of the prism, however, after the synthetic resin is worked into a prism by injection molding, cutting or the like, it is required to form a coating as a rear face mirror on an arbitrary slant surface of the prism. Heretofore, such a coating was formed by using the same evaporating material as in the glass optical part with a film structure.

In case of the synthetic resin optical parts, when the coating is carried out by using the same evaporating material with the same film structure as in the glass optical part, microcracks are generated after the film formation, or the adhesion property of the film to the substrate is insufficient, or even if there is no accident after the evaporation, microcracks are caused after the test for environmental resistance.

In general, when a pentaprism for camera or the like is used as a glass optical part, Ag is directly evaporated onto a glass substrate as a rear face mirror, and Cu is evaporated thereon as a protective film. On the other hand, when such a film structure is applied to a synthetic resin substrate such as acrylic resin or the like, the optical performances can be satisfied, but the durability performance can not be satisfied. That is, when the latter case is subjected to a peeling test with a cellulosic tape in which the cellulosic tape is adhered to the surface of the film and rapidly removed off therefrom, the film is easily peeled off from the synthetic resin substrate. Moreover, when a thermal shock test of a cycle $\{-20°\ C.\rightarrow$ room temperature $(20\sim25°\ C.)\rightarrow60°\ C.\}$ is repeated 5 times as a test for environmental resistance, the occurrence of microcracks is observed. Even when Al is used instead of Ag and SiO is used as a protective film, the same phenomenon as described above is also caused, so that it is impossible to satisfy sufficient durability.

SUMMARY OF THE INVENTION

It is, therefore, an object of the invention to solve the aforementioned problems of the conventional technique and to provide a rear face mirror of multilater film for synthetic resin optical parts capable of sufficiently satisfyinq basic optical properties (spectroreflectivity) as an intial performance inclusive of reproducibility and having improved durabilities against thermal shock test, adhesion test and the like.

According to a first aspect of the invention, there is the provision of a rear face mirror of multilayer film for synthetic resin optical part comprising a synthetic resin substrate and a five layer laminate formed on a surface of said substrate, wherein a first layer viewing from a side of said surface is SiO layer having an optical thickness $(n_1d_1)$ of $0<n_1d_1\leq0.1\lambda_0$, a second layer is $CeO_2$ layer having an optical thickness $(n_2d_2)$ of $0.19\lambda_0\leq n_2d_2\leq0.25\lambda_0$, a third layer is $SiO_2$ layer having an optical thickness $(n_3d_3)$ of $0.25\lambda_0\leq n_3d_3\leq0.3\lambda_0$, a fourth layer is Al layer having a mechanical thickness $(d_4)$ of $100\sim200$ nm, and a fifth layer is SiO layer having an optical thickness $(n_5d_5)$ of $0.18\lambda_0\leq n_5d_5\leq0.25\lambda_0$.

According to a second aspect of the invention, there is the provision of a rear face mirror of multilayer film for synthetic resin optical part comprising a synthetic resin substrate and a five layer laminate formed on a surface of said substrate, wherein a first layer viewing from a side of said surface is SiO layer having an optical thickness $(n_1d_1)$ of $0<n_1d_1\leq0.1\lambda_0$, a second layer is $CeO_2$ layer having an optical thickness $(n_2d_2)$ of $0.19\lambda_0\leq n_2d_2\leq0.25\lambda_0$, a third layer is $SiO_2$ layer having an optical thickness $(n_3d_3)$ of $0.25\lambda_0\leq n_3d_3\leq0.3\lambda_0$, a fourth layer is Ag layer having a mechanical thickness $(d_4)$ of $100\sim200$ nm, and a fifth layer is Cu layer having a mechanical thickness $(d_5)$ of $100\sim200$ nm.

According to a third aspect of the invention, there is the provision of a rear face mirror of multilayer film for synthetic resin optical part comprising a synthetic resin substrate and a six layer laminate formed on a surface of said substrate, wherein a first layer viewing from a side of said surface is SiO layer having an optical thickness $(n_1d_1)$ of $0<n_1d_10.1\lambda_0$, a second layer is $SiO_2$ layer having an optical thickness $(n_2d_2)$ of $0<n_2d_20.1\lambda_0$, a third layer is $CeO_2$ layer having an optical thickness $(n_3d_3)$ of $0.19\lambda_0\leq n_3d_3\leq0.25\lambda_0$, a fourth layer is $SiO_2$ layer having an optical thickness $(n_4d_4)$ of $0.25\lambda_0\leq n_4d_4\leq0.3\lambda_0$, a fifth layer is Al layer having a mechanical thickness $(d_5)$ of $100\sim200$ nm, and a sixth layer is $SiO_2$ layer having an optical thickness $(n_6d_6)$ of $0.18\lambda_0\leq n_6d_6\leq0.25\lambda_0$.

According to a fourth aspect of the invention, there is the provision of a rear face nirror of multilayer film for synthetic resin optical part comprising a synthetic resin substrate and a six layer laminate formed on a surface of said substrate, wherein a first layer viewing from a side of said surface is SiO layer having an optical thickness $(n_1d_1)$ of $0<n_1d_1\leq0.1\lambda_0$, a second layer is $SiO_2$ layer having an optical thickness $(n_2d_2)$ of $0<n_2d_2\leq0.1\lambda_0$, a third layer is $CeO_2$ layer having an optical thickness $(n_3d_3)$ of $0.19\lambda_0\leq n_3d_3\leq0.25\lambda_0$, a fourth layer is $SiO_2$ layer having an optical thickness $(n_4d_4)$ of $0.25\lambda_0\leq n_4d_4\leq0.3\lambda_0$, a fifth layer is Ag layer having a mechanical thickness $(d_5)$ of $100\sim200$ nm, and a sixth layer is Cu layer having a mechanical thickness $(d_6)$ of $100\sim200$ nm.

Moreover, according to the invention, the reason why the thickness of the metal thin film is limited to a range of $100\sim200$ nm is due to the fact that when the thickness is less than 100 nm, a light undesirably permeates through the film, while when it exceeds 200 nm, the film crack or film peeling is caused because the substrate is made from the synthetic resin.

As mentioned above, the multilayer film structure according to the invention is comprised of transparent dielectric films of SiO, $SiO_2$ and $CeO_2$ and metal thin films, each of these film is formed by vacuum evaporation. Such a vacuum evaporation is carried out in an atmosphere of room temperature $(20°\ C.\sim25°\ C)$.

BRIEF DESCRIPTION OF THE DRAWINGS

The invention will be described with reference to the accompanying drawings, wherein:

FIG. 3 is a schematically front view of a third embodiment of the multilayer film rear face mirror according to the invention.

DESCRIPTION OF THE PREFERRED EMBODIMENTS

In the multilayer film rear face mirror for synthetic resin optical part according to the invention, the first layer of SiO in case of the five layer structure, and the first and second layers of SiO and $SiO_2$ in case of the six layer structure contribute to the adhesion property to the synthetic resin substrate and the crack resistance. Furthermore, the second to fourth layers of $CeO_2$ to Al or Ag in case of the five layer structure, and the third to fifth layers of $CeO_2$ to Al or Ag in case of the six layer structure contributes to develop an effect on optical properties such as spectroreflectivity and the like. That is, the reflectivity effect of not less than 90% is determined by the refractive indexes and thicknesses of three layers from the $CeO_2$ layer. Moreover, the final layer (SiO layer or Cu layer) is a protective layer for preventing the oxidation.

Therefore, the multilayer film rear face mirror for the synthetic resin optical part according to the invention is roughly divided into (1) layers contributing to the adhesion property and the crack resistance, (2) layers contributing to the optical properties (reflectivity), and (3) layer for the prevention of oxidation.

The following examples are given in illustration of the invention and are not intended as limitations thereof.

EXAMPLE 1

Figure 1:
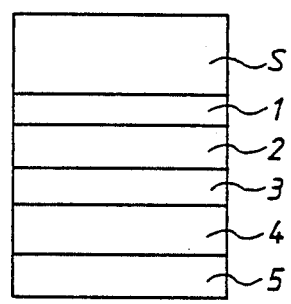
FIG. 1 is a schematically front view of a first embodiment of the multilayer film rear face mirror according to the invention.

In this example, the rear face mirror against a light at an incidental angle of 45° was comprised of five layer structure as shown in Table 1 and FIG. 1. In Table 1, $\lambda_0$ is a design wavelength, which is 500 nm in this example.

TABLE 1

| | Refractive index (n) | Optical thickness(nd) | Substance |
|---|---|---|---|
| Substrate (S) | 1.49 | — | PMMA |
| First layer(1) | 1.80 | $0.1\lambda_0$ | SiO |
| Second layer(2) | 1.95 | $0.195\lambda_0$ | $CeO_2$ |
| Third layer(3) | 1.47 | $0.30\lambda_0$ | $SiO_2$ |
| Fourth layer(4) | 0.55 | * | Al |
| Fifth layer(5) | 1.80 | $0.18\lambda_0$ | SiO |

($\lambda_0$ = 500 nm)
*Al: mechanical thickness (d) = 100 nm

Onto a surface of the synthetic resin substrate S made from an acrylic resin (PMMA) having a refractive index n=1.49 was formed SiO layer 1 as a first layer by vacuum evaporating SiO under a high vacuum of not lower than $1\sim2\times10^{-5}$ Torr through a resistor heating process. Then, $CeO_2$ layer 2 was formed on the SiO layer 1 as a second layer by vacuum evaporating $CeO_2$ through an electron gun process. Further, $SiO_2$ layer 3 was formed on the $CeO_2$ layer 2 as a third layer by vacuum evaporating $SiO_2$ through an electron gun process. Moreover, Al layer 4 was formed on the $SiO_2$ layer 3 as a fourth layer by vacuum evaporating Al through a resistor heating process or an electron gun process. Finally, SiO layer 5 was formed on the Al layer 4 as a fifth layer by vacuum evaporating SiO through the resistor heating process in the same manner as in the first layer.

Figure 2:
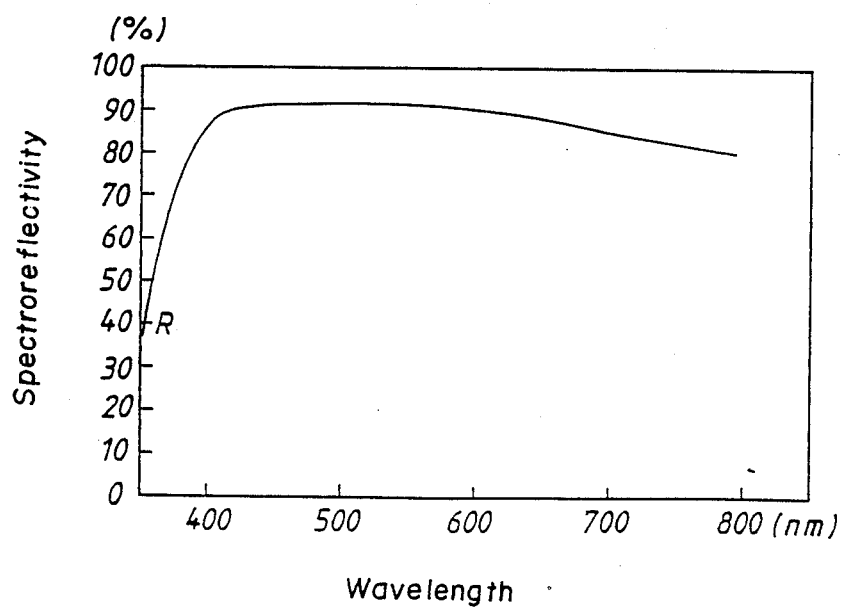
FIG. 2 is a graph showing a spectroreflectivity of the rear face mirror in the first embodiment.

The spectroreflectivity of the multilayer film rear face mirror obtained in this example with respect to incidental angle of 45° was measured to obtain a result as shown in FIG. 2. As seen from FIG. 2, the multilayer film rear face mirror of this example had basic optical properties (spectroreflectivity) as initial performances.

Furthermore, the adhesion test was carried out by adhering a cellulose tape (width: 18 mm) to the film surface of the multilayer film rear face mirror and removing out the tape from the adhesion face at an angle of about 45°, whereby the film peeling was not caused.

Moreover, there was observed no accident when the multilayer film rear face mirror of this example was subjected to a thermal shock test of repeating cycle of $\{-20°\text{ C.} \rightarrow \text{room temperature} (20\sim25°\text{ C.}) \text{ u} +60°\text{ C.}\}$ 5 times as an environmental test.

EXAMPLE 2

Figure 3:
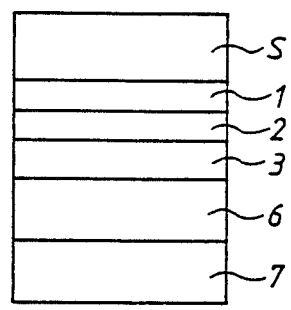
FIG. 3 is a schematically front view of a second embodiment of the multilayer film rear face mirror according to the invention.

In this example, the rear face mirror against a light at an incidental angle of 45° was comprised of five layer structure as shown in Table 2 and FIG. 3 likewise Example 1. In Table 2, $\lambda_0$ is a design wavelength, which is 500 nm in this example.

TABLE 2

| | Refractive index (n) | Optical thickness(nd) | Substance |
|---|---|---|---|
| Substrate (S) | 1.49 | — | PMMA |
| First layer(1) | 1.80 | $0.1\lambda_0$ | SiO |
| Second layer(2) | 1.95 | $0.195\lambda_0$ | $CeO_2$ |
| Third layer(3) | 1.47 | $0.15\lambda_0$ | $SiO_2$ |
| Fourth layer(6) | 0.14 | * | Ag |
| Fifth layer(7) | 0.23 | * | Cu |

($\lambda_0$ = 500 nm)
*Ag: mechanical thickness (d) = 100 nm
Cu: mechanical thickness (d) = 100 nm Onto a surface of the synthetic resin substrate S made from an acrylic resin (PMMA) having a refractive index n=1.49 was formed SiO layer 1 as a first layer by vacuum evaporating SiO under a high vacuum of not lower than $1\sim2\times10^{-5}$ Torr through a resistor heating process. Then, $CeO_2$ layer 2 was formed on the SiO layer 1 as a second layer by vacuum evaporating $CeO_2$ through an electron gun process. Further, $SiO_2$ layer 3 was formed on the $CeO_2$ layer 2 as a third layer by vacuum evaporating $SiO_2$ through an electron gun process. Moreover, Ag layer 6 was formed on the $SiO_2$ layer 3 as a fourth layer by vacuum evaporating Ag through a resistor heating process or an electron gun process. Finally, Cu layer 7 as a protective layer was formed on the Ag layer 6 as a fifth layer by vacuum evaporating Cu through the resistor heating process in the same manner as in the first layer.

Figure 4:
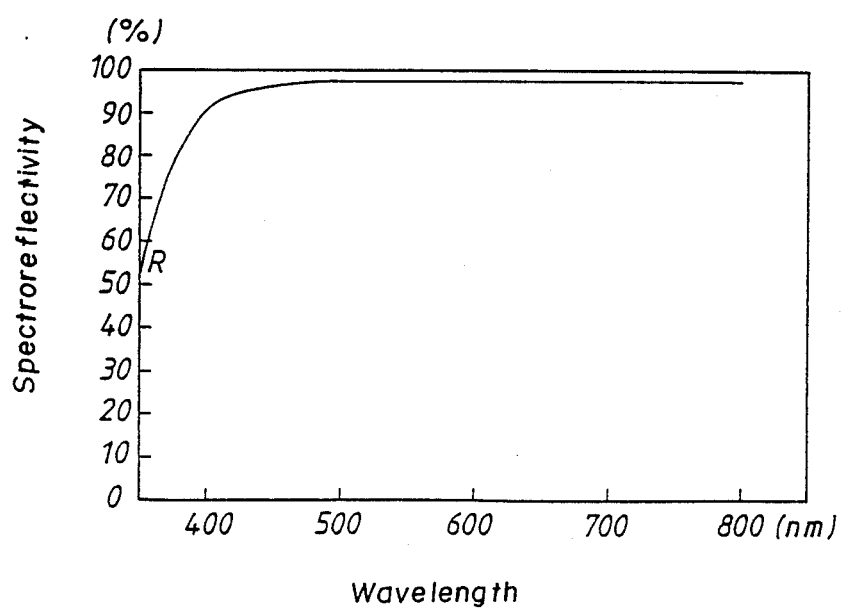
FIG. 4 is a graph showing a spectrorefectivity of the rear face mirror in the second embodiment.

The spectroreflectivity of the multilayer film rear face mirror obtained in this example with respect to incidental angle of 45° was measured to obtain a result as shown in FIG. 4. As seen from FIG. 4, the multilayer film rear face mirror of this example had basic optical properties (spectroreflectivity) as initial performances.

The same adhesion test and environmental test as in Example 1 were made with respect to the multilayer film rear face mirror of this example, from which it was confirmed that the film peeling was not caused and no accident was recognized.

EXAMPLE 3

Figure 5:
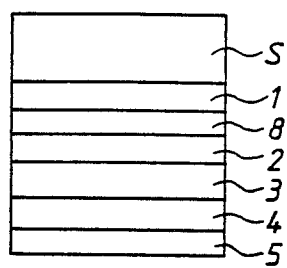

In this example, the rear face mirror against a light at an incidental angle of 45° was comprised of six layer structure as shown in Table 3 and FIG. 5. In Table 3, $\lambda_0$ is a design wavelength, which is 500 nm in this example.

TABLE 3

| | Refractive index (n) | Optical thickness(nd) | Substance |
|---|---|---|---|
| Substrate (S) | 1.49 | — | PMMA |
| First layer(1) | 1.80 | $0.1\lambda_0$ | SiO |
| Second alyer(8) | 1.47 | $0.1\lambda_0$ | $SiO_2$ |
| Third layer(2) | 1.95 | $0.195\lambda_0$ | $CeO_2$ |
| Fourth layer(3) | 1.47 | $0.30\lambda_0$ | $SiO_2$ |
| Fifth layer(4) | 0.55 | * | Al |
| Sixth layer(5) | 1.80 | $0.18\lambda_0$ | SiO |

($\lambda_0$ = 500 nm)
*Al: mechanical thickness (d) = 100 nm

Onto a surface of the synthetic resin substrate S made from an acrylic resin (PMMA) having a refractive index n=1.49 was formed SiO layer 1 as a first layer by vacuum evaporating SiO under a high vacuum of not lower than $1 \sim 2 \times 10^{-5}$ Torr through a resistor heating process. Then, $SiO_2$ layer 8 was formed on the SiO layer 1 as a second layer by vacuum evaporating $SiO_2$ through an electron gun process. Furthermore, $CeO_2$ layer 2 was formed on the $SiO_2$ layer 8 as a third layer by vacuum evaporating $CeO_2$ through an electron gun process. And also, $SiO_2$ layer 3 was formed on the $CeO_2$ layer 2 as a fourth layer by vacuum evaporating $SiO_2$ through an electron gun process. Moreover, Al layer 4 was formed on the $SiO_2$ layer 3 as a fifth layer by vacuum evaporating Al through a resistor heating process or an electron gun process. Finally, SiO layer 5 as a protective layer was formed on the Al layer 4 as a sixth layer by vacuum evaporating SiO through the resistor heating process in the same manner as in the first layer.

Figure 6:
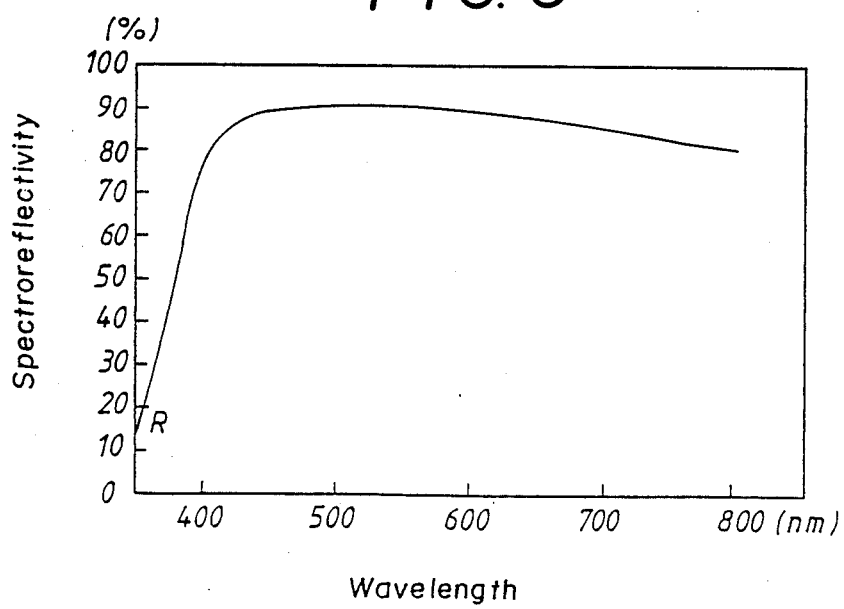
FIG. 6 is a graph showing a spectroreflectivity of the rear face mirror in the third embodiment.

The spectroreflectivity of the multilayer film rear face mirror obtained in this example with respect to incidental angle of 45° was measured to obtain a result as shown in FIG. 6. As seen from FIG. 6, the multilayer film rear face mirror of this example had basic optical properties (spectroreflectivity) as initial performances.

Furthermore, the same adhesion test and environmental test as in Example 1 were made with respect to the multilayer film rear face mirror of this example, from which it has been confirmed that the film peeling was not caused and no accident was recognized.

Moreover, similar results could be obtained even when Ag layer was used as a fifth layer and Cu layer was used as a sixth layer in Example 3.

As mentioned above, according to the multilayer film rear face mirrors for the synthetic resin optical parts according to the invention, films of SiO, ($SiO_2$), $CeO_2$, $SiO_2$, Al(Al) and SiO(Cu) having given thicknesses are formed on the surface of the synthetic resin substrate, so that the basic optical properties (spectroreflectivity: not less than 90%, incidental angle 45°, $\lambda_0$=500 nm) can be satisfied as an initial performance. Further, there is caused no microcrack in the mirror film and the deformation and degradation of the synthetic resin susbtrate are not caused, and hence the appearance property is good. Moreover, after the durability test, there is caused no film peeling nor occurrence of microcrack, and also the deformation and degradation of the synthetic resin substrate are not caused.

What is claimed is:

1. A rear face mirror of multilayer film for synthetic resin optical part comprising a synthetic resin substrate and a five layer laminate formed on a surface of said substrate, wherein a first layer viewing from a side of said surface is SiO layer having an optical thickness $(n_1d_1)$ of $0 < n_1d_1 \leq 0.1\lambda_0$, a second layer is $CeO_2$ layer having an optical thickness $(n_2d_2)$ of $0.19\lambda_0 \leq n_2d_2 \leq 0.25\lambda_0$, a third layer is $SiO_2$ layer having an optical thickness $(n_3d_3)$ of $0.25\lambda_0 \leq n_3d_3 \leq 0.3\lambda_0$, a fourth layer is Al layer having a mechanical thickness $(d_4)$ of $100 \sim 200$ nm, and a fifth layer is SiO layer having an optical thickness $(n_5d_5)$ of $0.18\lambda_0 \leq n_5d_5 \leq 0.25\lambda_0$.

2. A rear face mirror of multilayer film for synthetic resin optical part comprising a synthetic resin substrate and a five layer laminate formed on a surface of said substrate, wherein a first layer viewing from a side of said surface is SiO layer having an optical thickness $(n_1d_1)$ of $0 < n_1d_1 \leq 0.1\lambda_0$, a second layer is $CeO_2$ layer having an optical thickness $(n_2d_2)$ of $0.19\lambda_0 \leq n_2d_2 \leq 0.25\lambda_0$, a third layer is $SiO_2$ layer having an optical thickness $(n_3d_3)$ of $0.25\lambda_0 \leq n_3d_3 \leq 0.3\lambda_0$, a fourth layer is Ag layer having a mechanical thickness $(d_4)$ of $100 \sim 200$ nm, and a fifth layer is Cu layer having a mechanical thickness $(d_5)$ of $100 \sim 200$ nm.

3. A rear face mirror of multilayer film for synthetic resin optical part comprising a synthetic resin substrate and a six layer laminate formed on a surface of said substrate, wherein a first layer viewing from a side of said surface is SiO layer having an optical thickness $(n_1d_1)$ of $0 < n_1d_1 \leq 0.1\lambda_0$, a second layer is $SiO_2$ layer having an optical thickness $(n_2d_2)$ of $0 < n_2d_2 \leq 0.1\lambda_0$, a third layer is $CeO_2$ layer having an optical thickness $(n_3d_3)$ of $0.19\lambda_0 \leq 0.25\lambda_0$, a fourth layer is $SiO_2$ layer having an optical thickness $(n_4d_4)$ of $0.25\lambda_0 \leq n_4d_4 \leq 0.3\lambda_0$, a fifth layer is Al layer having a mechanical thickness $(d_5)$ of $100 \sim 200$ nm, and a sixth layer is $SiO_2$ layer having an optical thickness $(n_6d_6)$ of $0.18\lambda_0 \leq n_6d_6 \leq 0.25\lambda_0$.

4. A rear face mirror of multilayer film for synthetic resin optical part comprising a synthetic resin substrate and a six layer laminate formed on a surface of said substrate, wherein a first layer viewing from a side of said surface is SiO layer having an optical thickness $(n_1d_1)$ of $0 < n_1d_1 \leq 0.1\lambda_0$, a second layer is $SiO_2$ layer having an optical thickness $(n_2d_2)$ of $0 < n_2d_2 \leq 0.1\lambda_0$, a third layer is $CeO_2$ layer having an optical thickness $(n_3d_3)$ of $0.19\lambda_0 \leq 0.25\lambda_0$, a fourth layer is $SiO_2$ layer having an optical thickness $(n_4d_4)$ of $0.25\lambda_0 \leq n_4d_4 \leq 0.3\lambda_0$, a fifth layer is Ag layer having a mechanical thickness $(d_5)$ of $100 \sim 200$ nm, and a sixth layer is Cu layer having a mechanical thickness $(d_6)$ of $100 \sim 200$ nm.

* * * * *